United States Patent
Wu

[11] Patent Number: 5,782,942
[45] Date of Patent: Jul. 21, 1998

[54] FILTER SYSTEM FOR SEMICONDUCTOR FURNACE

[75] Inventor: Wen-Kai Wu, Kao-Hsiung, Taiwan

[73] Assignee: Vanguard International Semiconductor Corporation, Hsin-Chu, Taiwan

[21] Appl. No.: 585,065

[22] Filed: Jan. 11, 1996

[51] Int. Cl.$^6$ ............................................. B01D 46/00
[52] U.S. Cl. ........................... 55/312; 55/385.1; 438/795; 438/799; 438/909
[58] Field of Search ...................... 55/385.1, 312, 55/309, 212, 482, 484; 95/273, 286; 432/72, 73, 152; 437/247, 248, 250; 438/795, 799, 905, 909

[56] References Cited

U.S. PATENT DOCUMENTS

| | | | |
|---|---|---|---|
| 4,717,472 | 1/1988 | Oberg | 210/90 |
| 4,906,257 | 3/1990 | Fukunaga et al. | 55/312 |
| 4,940,213 | 7/1990 | Ohmine et al. | 55/337 |
| 5,088,922 | 2/1992 | Kakizaki et al. | 432/72 |
| 5,131,931 | 7/1992 | Miley et al. | 55/481 |
| 5,227,334 | 7/1993 | Sandhu | 437/247 |
| 5,250,092 | 10/1993 | Nakano | 55/DIG. 46 |
| 5,514,196 | 5/1996 | Tanahashi et al. | 55/324 |

FOREIGN PATENT DOCUMENTS

| | | | |
|---|---|---|---|
| 3238577 | 4/1984 | Germany | 55/312 |
| 59-82927 | 5/1984 | Japan . | |
| 1-15373 | 1/1989 | Japan . | |
| 2068771 | 8/1981 | United Kingdom | 55/312 |

*Primary Examiner*—Duane S. Smith
*Attorney, Agent, or Firm*—George O. Saile; Stephen B. Ackerman; William S. Robertson

[57] ABSTRACT

An improved filter system, particularly for the furnaces of a semiconductor manufacturing plant, has a standby filter and a piping system for connecting it momentarily in parallel with a normally used filter of one of the furnaces. A system of valves permits the normal filter to be isolated from its furnace so that it can be allowed to cool and then removed and replaced. The filter system avoids the problem that a standby filter is otherwise required for each furnace or that the replacement can not be made at a convenient time.

5 Claims, 1 Drawing Sheet

1

FILTER SYSTEM FOR SEMICONDUCTOR FURNACE

FIELD OF THE INVENTION

This invention relates generally to a system of gas filters in which the filters are easily changed. More specifically the invention relates to a system of filters for furnaces used in manufacturing semiconductors.

INTRODUCTION

The problem of changing filters is familiar in many situations. In a familiar example, home heating systems that operate by circulating heated air commonly have a filter in a central air duct.

The filter system of this invention is particularly intended for use with furnaces used in manufacturing semiconductor devices. These furnaces heat a semiconductor wafer in an atmosphere that is poisonous (e.g. $PH_3$) or corrosive (e.g. $SiH_2Cl_2$, $NH_3$) or otherwise must not be released to the outside atmosphere. The furnaces must exhaust to the atmosphere, and accordingly they are provided with effective filters. The invention will be useful in other applications that present some or all of the problems of a semiconductor furnace, but it will simplify the description of the invention to discuss only its application to a semiconductor furnace.

Changing these filters presents several problems. First, because the gasses are poisonous or corrosive, a filter can't simply be bypassed to the atmosphere while it is being changed. Second, it is undesirable to stop the semiconductor manufacturing process for changing filters. In the prior art the filters have been changed when a furnace has been shut down for some other reason.

It would be advantageous to be able to change a filters when needed, without regard to the operating schedule for the furnaces. Changing these filters presents further problems because the filters are hot, having an operating temperature of over 500° C. A filter that is being replaced takes between 4 and 5 hours to cool down and a new filter that has just been installed takes about 2 hours to heat to an operating temperature. During the times for cooling an off-going filter and heating the on-coming filter, neither filter can be used.

Changing a filter presents other problems because the filters are large and heavy. A filter weighs about 25 kilograms and has a cylindrical and is about 1300 millimeters in length and 200 millimeters in diameter. Therefore, these filters require special handling equipment, and normally this handling equipment is part of the installation for each filter.

THE PRIOR ART

The art of filtering for semiconductor furnaces has suggested providing duplicate filters connected in parallel. Valves in each inlet flow line let one filter handle the furnace exhaust and the other filter stands ready. When one filter is to be replaced, the valves are operated to switch the new filter into the system, temporarily in parallel with the off-going filter. Then the off-going filter is removed from the system. A new filter can then be put into the system.

It is not possible to connect all of the furnaces to two parallel filters, one of which could be isolated from the furnaces to be replaced. The capacity of a filter is matched to the exhaust gas capacity of a furnace and one filter will not handle more than one furnace. (In a commercial example, a furnace has an exhaust capacity of 50 liters per minute and a filter has a capacity of 60 liters per minute.)

SUMMARY OF THE INVENTION

Since a semiconductor manufacturing plant has several furnaces, the parallel filter system proposed in the prior art would require an undesirable number of idle filters. In addition, these filters are commonly changed while they are still hot, and they are quite heavy. Complex and expensive handling equipment is required for each filter.

According to this invention, the semiconductor plant has one standby filter. This filter is preferably like the other filters and it has the same handling equipment. Each normal filter inlet has a valve between its inlet and the pipe to the furnace, and this valve can be closed to isolate the filter from the pipe and the furnace. Upstream of this valve is a valve that connects to a pipe that goes to a common connection point for these pipes from each normal filter. A valve connects this common point to the inlet of the standby filter.

In normal operation, the valves to the inlets of the normal filters are open and the exhaust from each furnace is directed to its associated filter. The valves between the inlet pipes and the common point are each closed to isolate the pipe for each filter from every other pipe and its filter. Preferably, the valve in the piping between the common connection point and the inlet of the standby filter is closed.

For changing one of the normal filters, its valve to the standby filter is opened and the normal filter and the standby filter operate momentarily in parallel. Then the valve to the normal filter is closed and the furnace operates only with the standby filter. The normal filter is allowed to cool and is then replaced and its inlet valve is opened so the replacement filter and the standby filter operate in parallel. The valve to the standby filter is then closed.

Typically, a filter lasts between a month and a month and a half. Thus, in a semiconductor manufacturing facility a filter is changed from time to time, but filters are not changed so frequently as to require changing two filters at the same time. (Filter changing requires a number of people.)

The description of the preferred filter system will suggest other objects and advantages of the invention.

THE PREFERRED EMBODIMENT

Introduction

Figure 1:
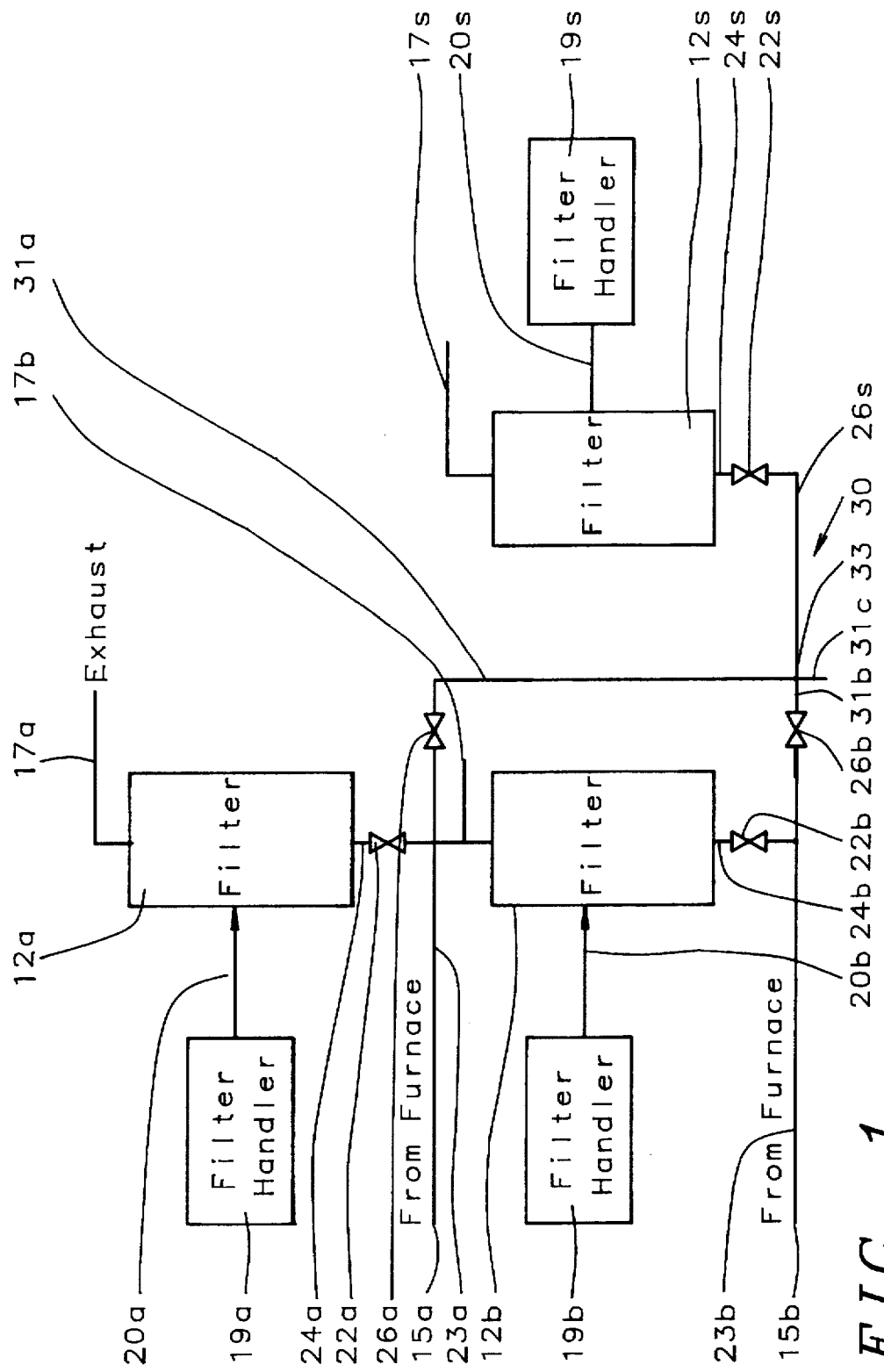
FIG.1 is a block diagram of a system of filters and piping connecting the filters to furnaces for semiconductor manufacture.

The normal filters are conventional and filters are shown by functional boxes 12a and 12b. Some components associated with filters 12a and 12b will be identified with a numerical reference character and a subscript "a" or "b" that relates the reference character to a specific one of these filters. After a set of similar components have been introduced in the way, the number without the subscript will be used where the components are referred to generally.

Filters 12a and 12b are representative of a suitable number of filters for the semiconductor manufacturing plant, preferably one for each furnace. The furnaces are conventional and are not shown in the drawing.

A piping means 15a, 15b connects the associated filter 12a and 12b to its furnace. The piping means includes a pump in each line 15a, 15b which is conventional and is not shown in the drawing. Each filter also has an exhaust pipe 17a, 17b.

The filter handling apparatus is also conventional and is shown by functional boxes 19a, 19b. An arrowed line 20a, 20b from a handling apparatus to its filter represents the operation of positioning the filter and the corresponding structure.

The Standby Filter

According to this invention, an extra filter 12s is provided. Where this filter and its associated components are structurally similar to the normal filters and components, the same reference character is used with the subscript s (for standby).Thus, reference characters 17s, 19s and 20s in FIG. 1 identify components of the standby filter.

A valve 22a, 22b is connected between the downstream end 23a, 23b of each piping means 15 to the inlet side 24a, 24b of its normal filter, and a second valve 26a, 26b connects each inlet 24 to the standby filter 12s. A valve 22s and a pipe 26s connects the inlet 24s of the standby filter to a piping system 30 that collects the gasses that are otherwise directed to a normal filter through its valve 22.

The drawing shows piping system 30 as a pipe 31a, 31b for each furnace leading from the associated valve 26 to a common point 33. The dashed line 31c represents a pipe for connecting other furnaces to point 33. Alternatively, line 26s for the standby filter can be connected at any point of the line 31a, 31b that collects the gasses of the furnaces. A suitable layout for the piping system 30 will be apparent from the physical locations for the furnaces.

Replacing a Filter

Suppose filter 12a is to be replaced. Valves 26a and 22s are opened to momentarily connect pipe 15a to the standby filter 12s. The furnace using pipe 15a continues in normal operation with its gasses flowing through both filters 12a and 12s. Valve 22a is then closed to isolate filter 12 a from pipe 15a and all other components of the piping system. The filter handler 19a is operated to remove filter 12a and to install a new filter in its place. Then valve 22a is opened to connect new filter 12a in parallel with the standby filter. Valve 26a is then closed to isolate filter 12a and its furnace from the other furnaces. Then valve 22s is closed to isolate the standby filter from the other components.

Replacing the Standby Filter

Ordinarily, the standby filter will be used so little that it can be replaced when the plant is closed for some other reason. However, it can be isolated from the system by closing valve 22s and it can then be removed and replaced. Thus, the standby filter can be used extensively for changing filters as already described or for any other purpose such as operating while one of the normal filters is disconnected for repair.

Other Embodiments

From the description of the preferred embodiment of the invention, those skilled in the art will recognize various modifications within the spirit of the invention and the intended scope of the claims.

I claim:

1. In a system having a plurality of semiconductor manufacturing furnaces producing a gas to be filtered, a normal filter (12a, 12b) for each furnace and a piping means (15a, 15b) connecting the inlet (22a, 22b) of each normal filter to the associated furnace, an improvement for simplifying the operation of changing a filter, comprising a standby filter (12s), a piping system (30) connecting the inlet (24s) of the standby filter to the piping means (15a, 15b) of a selected furnace for handling the exhaust of the selected furnace in parallel with the normal filter of the selected furnace, the piping system connecting the standby filter including a valve (26a, 26b) for isolating each furnace from the piping system and the standby filter, and a valve (22a, 22b) for each normal filter located to isolate the filter inlet from the associated pipe to the exhaust producing furnace for isolating the normal filter from the associated furnace to permit replacing the isolated normal filter.

2. In semiconductor manufacturing facility having a plurality of furnaces each producing a gas to be filtered for corrosive or poisonous gasses, a normal filter (12a, 12b) for each furnace and a piping means (15a, 15b) connecting the inlet (22a, 22b) of each normal filter to the associated furnace, an improvement for simplifying the operation of changing a filter, comprising a standby filter (12s), a piping system (30) connecting the inlet (24s) of the standby filter to the piping means (15a, 15b) of a selected furnace for handling the exhaust of the selected furnace in parallel with the normal filter of the selected furnace, the piping system connecting the standby filter including a valve (26a, 26b) for isolating each furnace from the piping system and the standby filter, and a valve (22a, 22b) for each normal filter located to isolate the filter inlet from the associated pipe to the exhaust producing furnace for isolating the normal filter from the associated furnace to permit replacing the isolated normal filter.

3. The gas filter system of claim 2 wherein each normal filter has a filter changing means and the standby filter also has a filter changing means.

4. The gas filter system of claim 3 wherein the filter changing means for the standby filter is substantially the same as the filter changing means of the normal filters.

5. A gas filter system for semiconductor manufacturing plant having a plurality of furnaces that each have a normally used gas filter (12a, 12b) and apparatus (19a, 19b) for changing the filter, wherein the improvement comprises, for each normally used filter, a gas inlet (24) and a gas outlet (17) and piping means (15) connecting each filter to an associated furnace for exhausting filtered gas to the atmosphere, for each normally used filter, first valve means (22) connecting the piping means to the inlet of the associated filter, the valve permitting the piping means and the associated furnace to be isolated from the atmosphere for removing the filter and replacing it with a replacement filter, and a standby filter (12s) and filter changing means, and a valve (22s) and a piping system (30) for selectively connecting the standby filter in parallel with a selected normally used filter while the normally used filter is replaced.

\* \* \* \* \*